United States Patent
Dietl et al.

(10) Patent No.: US 11,248,155 B2
(45) Date of Patent: Feb. 15, 2022

(54) COOLANT FOR COOLING SYSTEMS IN ELECTRIC VEHICLES HAVING FUEL CELLS AND/OR BATTERIES CONTAINING AZOLE DERIVATIVES AND ADDITIONAL CORROSION PROTECTANTS

(71) Applicant: BASF SE, Ludwigshafen am Rhein (DE)

(72) Inventors: Harald Dietl, Ludwigshafen (DE); Roger Sieg, Ludwigshafen (DE)

(73) Assignee: BASF SE, Ludwigshafen am Rhein (DE)

( * ) Notice: Subject to any disclaimer, the term of this patent is extended or adjusted under 35 U.S.C. 154(b) by 249 days.

(21) Appl. No.: 16/461,696

(22) PCT Filed: Nov. 14, 2017

(86) PCT No.: PCT/EP2017/079162
§ 371 (c)(1),
(2) Date: May 16, 2019

(87) PCT Pub. No.: WO2018/095759
PCT Pub. Date: May 31, 2018

(65) Prior Publication Data
US 2019/0352553 A1    Nov. 21, 2019

(30) Foreign Application Priority Data
Nov. 23, 2016   (EP) ..................... 16200197

(51) Int. Cl.
C09K 5/20      (2006.01)
H01M 10/613    (2014.01)
H01M 10/625    (2014.01)
H01M 10/6567   (2014.01)
H01M 8/04029   (2016.01)
H01M 8/04701   (2016.01)

(52) U.S. Cl.
CPC ........... *C09K 5/20* (2013.01); *H01M 8/04029* (2013.01); *H01M 8/04701* (2013.01); *H01M 10/613* (2015.04); *H01M 10/625* (2015.04); *H01M 10/6567* (2015.04); *H01M 2220/20* (2013.01); *H01M 2250/20* (2013.01)

(58) Field of Classification Search
CPC ... C09K 5/20; C09K 5/00; C09K 5/08; C09K 5/10
See application file for complete search history.

(56) References Cited

U.S. PATENT DOCUMENTS

| 3,931,029 A | 1/1976 | Dutton et al. |
| 4,704,220 A | 11/1987 | Goddard et al. |
| 7,307,104 B2* | 12/2007 | Qiu .................. A61P 33/00 516/54 |
| 2003/0052302 A1 | 3/2003 | Eaton et al. |
| 2006/0219975 A1* | 10/2006 | Wenderoth .............. B60L 50/72 252/73 |
| 2009/0266519 A1* | 10/2009 | Marinho .................. C23F 11/08 165/104.19 |
| 2012/0064426 A1 | 3/2012 | Sato et al. |
| 2013/0092870 A1* | 4/2013 | Ha ............................ C09K 5/20 252/78.3 |
| 2013/0284971 A1* | 10/2013 | Dietl ........................ C09K 5/10 252/77 |
| 2014/0056756 A1* | 2/2014 | Dietl ........................ C09K 5/20 422/7 |
| 2015/0203735 A1* | 7/2015 | Dietl ........................ F01P 3/00 123/1 A |
| 2016/0075930 A1* | 3/2016 | Dietl ...................... C23F 11/02 252/77 |
| 2016/0257868 A1* | 9/2016 | Yang ...................... C23F 11/18 |
| 2018/0291250 A1* | 10/2018 | Yang ........................ C09K 5/20 |
| 2019/0225855 A1* | 7/2019 | Yang ...................... C23F 11/187 |
| 2020/0040244 A1* | 2/2020 | Yang ..................... C23F 11/126 |

FOREIGN PATENT DOCUMENTS

| DE | 1 948 794 | 4/1971 |
| DE | 198 02 490 A1 | 7/1999 |
| DE | 100 63 951 A1 | 6/2002 |
| DE | 101 04 771 A1 | 8/2002 |
| EP | 1 009 050 A2 | 6/2000 |
| EP | 2 549 575 A1 | 1/2013 |
| EP | 2 888 386 | 7/2015 |
| WO | WO 00/02978 A1 | 1/2000 |
| WO | WO 00/17951 A1 | 3/2000 |
| WO | WO 00/50543 A1 | 8/2000 |
| WO | WO 02/101848 A2 | 12/2002 |
| WO | WO 2009/124979 A1 | 10/2009 |
| WO | WO 2014/029654 A1 | 2/2014 |

OTHER PUBLICATIONS

Extended European Search Report dated May 23, 2017 in Patent Application No. 16200197.8 (with English translation of categories of cited documents).
International Search Report dated Feb. 13, 2018 in PCT/EP2017/079162 filed Nov. 14, 2017.

* cited by examiner

Primary Examiner — Jane L Stanley
(74) Attorney, Agent, or Firm — Grüneberg and Myers PLLC

(57) ABSTRACT

The present invention relates to coolants for cooling systems in electric vehicles having fuel cells and/or batteries, preferably for motor vehicles, particularly preferably for passenger cars and commercial vehicles (known as light and heavy duty vehicles), based on alkylene glycols or derivatives thereof, which comprise additional corrosion inhibitors for improved corrosion protection in addition to specific azole derivatives.

31 Claims, No Drawings

COOLANT FOR COOLING SYSTEMS IN ELECTRIC VEHICLES HAVING FUEL CELLS AND/OR BATTERIES CONTAINING AZOLE DERIVATIVES AND ADDITIONAL CORROSION PROTECTANTS

The present invention relates to coolants for cooling systems in electric vehicles having fuel cells and/or batteries, preferably in motor vehicles, particularly preferably in passenger cars and commercial vehicles (known as light and heavy duty vehicles), based on alkylene glycols or derivatives thereof, which contain additional corrosion inhibitors in addition to specific azole derivatives for improved corrosion protection.

Fuel cells and/or batteries for mobile use, in particular in motor vehicles, have to be able to be operated even at low exterior temperatures of down to about −40° C. A freezing-protected coolant circuit is therefore indispensable.

The use of conventional cooler protection compositions used in internal combustion engines would not be possible in the case of fuel cells and/or batteries without complete electric insulation of the cooling channels, since these compositions have an undesirably high electrical conductivity because of the salts and ionizable compounds comprised therein as corrosion inhibitors, which would adversely affect the function of the fuel cell or battery.

DE-A 198 02 490 (1) describes fuel cells having a freezing-protected cooling circuit in which a paraffinic isomer mixture having a pour point of less than −40° C. is used as coolant. However, the combustibility of such a coolant is disadvantageous.

EP-A 1 009 050 (2) discloses a fuel cell system for automobiles, in which air is used as cooling medium. However, this has the disadvantage that air is, as is known, a poorer heat conductor than a liquid cooling medium.

WO 00/17951 (3) describes a cooling system for fuel cells, in which a pure monoethylene glycol/water mixture in a ratio of 1:1 without additives is used as coolant. Since no corrosion protection at all would be present in respect of the materials present in the cooling system because of a lack of corrosion inhibitors, the cooling circuit comprises an ion-exchange unit in order to maintain the purity of the coolant and ensure a low specific conductivity over a prolonged period of time, as a result of which short circuits and corrosion are prevented. As suitable ion exchangers, mention is made of anionic resins such as those of the strongly alkaline hydroxyl type and cationic resins such as those based on sulfonic acid groups and also other filtration units such as activated carbon filters.

The structure and the function of a fuel cell for automobiles, in particular a fuel cell having an electron-conducting electrolyte membrane ("PEM fuel cell", "polymer electrolyte membrane fuel cell") is described by way of example in (3), with aluminum being preferred as preferred metal component in the cooling circuit (cooler).

WO 02/101848 A2 describes antifreeze compositions for cooling systems in fuel cell drives and concentrates thereof which comprise particular azole derivatives.

The antifreeze compositions display good corrosion protection on aluminum samples, but no longer satisfy modern requirements in respect of corrosion of iron and nonferrous metals.

DE-A 100 63 951 (4) describes coolants for cooling systems in fuel cell drives, which comprise ortho-silicic esters as corrosion inhibitors.

US 2012/0064426 A1 discloses coolants for fuel cells which comprise an ion exchanger, which coolants comprise ethylene glycol or propylene glycol as antifreeze component and inhibitors, for example, inter alia, azoles, against aluminum corrosion and also polyoxyethylene alkyl ethers or polyoxyethylene fatty acid esters as surface-active agents.

Apart from aluminum corrosion, no further corrosion is examined and the polyoxyethylene alkyl ethers or polyoxyethylene fatty acid esters used are employed exclusively as surface-active agents.

A main problem in cooling systems in fuel cell drives is, compared to conventional coolants, maintenance of a low electrical conductivity of the coolant in order to ensure safe and malfunction-free function of the fuel cell and batteries connected thereto and to prevent short circuits and corrosion in the long term.

U.S. Pat. No. 3,931,029 discloses antifreeze compositions which comprise ethylene glycol or diethylene glycol as antifreeze component and alkoxylated higher fatty acids or fatty amines as antifoams and also inorganic compounds as further inhibitors.

These inorganic compounds in these compositions are preferably used as alkali metal salts or ammonium salts, so that the compositions comprise a significant proportion of ionic constituents, so that these compositions are not suitable for use in fuel cells because of their inherent conductivity.

WO 2014 029654 A1 discloses corrosion protection formulations which can contain further additives in addition to glycols and polyalkylene glycols as antifreeze components and alkylamine ethoxylates as surfactant component. When choosing such additives, no attention is paid to the conductivity and anionic and cationic surfactants are also disclosed, with borax for adjusting the pH and carboxylic acids in the form of their salts.

These compositions, too, thus comprise a significant proportion of ionic constituents and are not suitable for use in fuel cells because of their inherent conductivity.

The same applies to U.S. Pat. No. 4,704,220, in which compositions which comprise at least one emulsifier and at least one organic hydrophobicizing agent and can be used as concentrates after dilution with water as coolant are described. The organic hydrophobicizing agent bears salt-forming groups and the emulsifier can also be anionic or cationic compounds. Inorganic compounds are added in a targeted manner to the water with which the compositions are admixed in the examples.

These compositions, too, thus comprise a significant proportion of ionic constituents and are not suitable for use in fuel cells because of their inherent conductivity.

It was an object of the present invention to make the antifreeze compositions known from WO 02/101848 A2 more corrosion-stable relative to metals other than aluminum.

It has now been found that the duration of a low electrical conductivity in a cooling system based on alkylene glycol/water can be significantly lengthened by addition of small amounts of azole derivatives even and particularly when it comprises, as per (3), an integrated ion exchanger. The good protection of aluminum and aluminum-comprising alloys against corrosion described in WO 02/101848 A2 is also offered for other metals, in particular iron materials, iron-comprising alloys and nonferrous metals, among these copper and brass in particular, by the use according to the invention of the compounds (V), (VI) and/or (VII). This covers in practice the advantage that the time intervals between two coolant changes for fuel cells can be extended further, which is of particular interest in the automobile sector.

Accordingly, we have found antifreeze concentrates for cooling systems in fuel cells and/or batteries, from which ready-to-use aqueous coolant compositions having a conductivity of not more than 50 μS/cm result, based on alkylene glycols or derivatives thereof which comprise one or more five-membered heterocyclic compounds (azole derivatives) having 2 or 3 heteroatoms from the group consisting of nitrogen and sulfur and comprise no or at most one sulfur atom and can bear an aromatic or saturated six-membered fused-on ring, and additionally comprise at least one of the compounds (V), (VI) and/or (VII). Preference is here given to antifreeze concentrates which comprise a total of from 0.05 to 5% by weight, in particular from 0.075 to 2.5% by weight, especially from 0.1 to 1% by weight, of the azole derivatives mentioned. Preference is given here to antifreeze compositions which comprise a total of from 0.05 to 5% by weight, in particular from 0.1 to 1% by weight, especially from 0.2 to 0.5% by weight, of at least one of the compounds (V), (VI) and/or (VII).

These five-membered heterocyclic compounds (azole derivatives) usually contain two N atoms and no S atom, 3 N atoms and no S atom or one N atom and one S atom as heteroatoms.

Preferred groups of the specified azole derivatives are annellated imidazoles and annellated 1,2,3-triazoles of the general formula

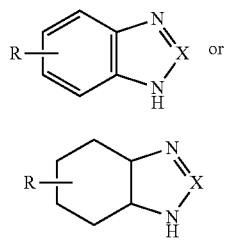

where
the variable R is hydrogen or a $C_1$-$C_{10}$-alkyl radical, in particular methyl or ethyl, and the variable X is a nitrogen atom or the C—H group.

Typical and preferred examples of azole derivatives of the general formula (I) are benzimidazole (X=C—H, R=H), benzotriazoles (X=N, R=H) and tolutriazole (tolyltriazole) (X=N, R=CH$_3$). A typical example of an azole derivative of the general formula (II) is hydrogenated 1,2,3-tolutriazole (tolyltriazole) (X=N, R=CH$_3$).

A further preferred group of the specified azole derivatives is benzothiazoles of the general formula (III)

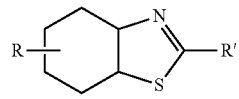

where
the variable R is as defined above and
the variable R' is hydrogen, a $C_1$-$C_{10}$-alkyl radical, in particular methyl or ethyl, or in particular a mercapto group (—SH). A typical example of an azole derivative of the general formula (III) is 2-mercaptobenzothiazole.

Further suitable azole derivatives are non-annellated azole derivatives of the general formula (IV)

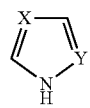

where
the variables X and Y together are two nitrogen atoms or one nitrogen atom and a C—H group,
for example 1H-1,2,4-triazole (X=Y=N) or preferably imidazole (X=N, Y=C—H).

For the purposes of the present invention, benzimidazole, benzotriazole, tolutriazole, hydrogenated tolutriazole or mixtures thereof, in particular benzotriazole or tolutriazole, are very particularly preferred as azole derivatives.

The azole derivatives mentioned are commercially available or can be prepared by conventional methods. Hydrogenated benzotriazoles such as hydrogenated tolutriazole are likewise obtainable as described in DE-A 1 948 794 (5) and are also commercially available.

Apart from the azole derivatives mentioned, the antifreeze concentrates of the invention preferably additionally comprise ortho-silicic esters as are described in (4). Typical examples of such ortho-silicic esters are tetraalkoxysilanes, preferably tetramethoxysilane and tetraethoxysilane, and alkoxyalkylsilanes, preferably triethoxymethylsilane, diethoxydimethylsilane, ethoxytrimethylsilane, trimethoxymethylsilane, dimethoxydimethylsilane and methoxytrimethylsilane. Preference is given to tetraalkoxysilanes, particularly preferably tetramethoxysilane and tetraethoxysilane, with very particular preference being given to tetraethoxysilane. Preference is given here to antifreeze concentrates, in particular those having a total content of from 0.05 to 5% by weight of the azole derivative mentioned, from which ready-to-use aqueous coolant compositions having a silicon content of from 2 to 2000 ppm by weight of silicon, in particular from 25 to 500 ppm by weight of silicon, result.

According to the invention, the antifreeze compositions and antifreeze concentrates of the present invention comprise at least one compound selected from the group consisting of compounds of the formula (V), compounds of the formula (VI), compounds of the formula (VII) and mixtures thereof.

These are compounds of the general formula (V)

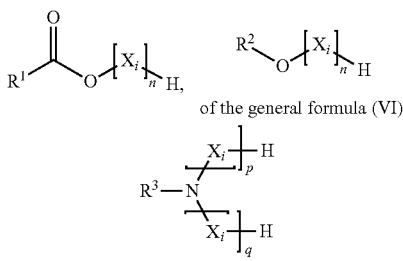

and also of the general formula (VII)

where
R$^1$ is an organic radical having from 7 to 21 carbon atoms, in particular an alkyl or alkenyl radical having from 7 to 21 carbon atoms, preferably from 9 to 19, particularly preferably from 11 to 19, very particularly preferably from 13 to 19, in particular from 15 to 19 and especially 17, carbon atoms, R$^2$ is an organic radical having from 8 to 22 carbon atoms, in particular an alkyl or alkenyl radical having from 8 to 22 carbon atoms, preferably from 10 to 20, particularly preferably from 12 to 20, very particularly preferably from 14 to 20, in particular from 16 to 20 and especially 18, carbon atoms, R$^3$ is an organic radical having from 6 to 10 carbon atoms, in particular an alkyl or alkenyl radical having from 6 to 10 carbon atoms, preferably from 7 to 9 and particularly preferably 8 carbon atoms, n is a positive integer from 10 to 60, preferably from 12 to 50, particularly preferably from 15 to 40, very particularly preferably from 18 to 30 and in particular from 20 to 25, p and q are each, independently of one another, a positive integer from 1 to 40, preferably from 1 to 30, particularly preferably from 2 to 25, very particularly preferably from 3 to 20 and in particular from 5 to 15, and each $X_i$ for i=1 to n, 1 to p and 1 to q is selected independently from the group consisting of —CH$_2$—CH$_2$—O—, —CH$_2$—CH(CH$_3$)—O—, —CH(CH$_3$)—CH$_2$—O—, —CH$_2$—C(CH$_3$)$_2$—O—, —C(CH$_3$)$_2$—CH$_2$—O—, —CH$_2$—CH(C$_2$H$_5$)—O—, —CH(C$_2$H$_5$)—CH$_2$—O—, —CH(CH$_3$)—CH(CH$_3$)—O—, —CH$_2$—CH$_2$—CH$_2$—O— and —CH$_2$—CH$_2$—CH$_2$—CH$_2$—O—, preferably selected from the group consisting of —CH$_2$—CH$_2$—O—, —CH$_2$—CH(CH$_3$)—O— and —CH(CH$_3$)—CH$_2$—O—, with particular preference being given to —CH$_2$—CH$_2$—O—.

It should be noted that the compounds of the formulae (V), (VI) and (VII) are usually reaction mixtures having a distribution of the product composition which depends on the reaction conditions. Thus, the length of the chain —[—$X_i$—]— is subject to a distribution about a statistical average, so that the values for n, p and q can be distributed about a statistical average. Thus, the value for n, p and q for each individual compound of the formula (V), (VI) or (VII) is a positive integer, but for the reaction mixture can on statistical average also have nonintegral values.

Among these, compounds of the formulae (V) and (VII) are preferred, and compounds of the formula (VII) are particularly preferred.

In a preferred embodiment of the present invention, the structural element R$^1$—COO— in formula (V) is derived from fatty acids or mixtures thereof, preferably from 2-ethylhexanoic acid, octanoic acid (caprylic acid), pelargonic acid (nonanoic acid), 2-propylheptanoic acid, decanoic acid (capric acid), undecanoic acid, dodecanoic acid (lauric acid), tridecanoic acid, tetradecanoic acid (myristic acid), pentadecanoic acid, palmitic acid (hexadecanoic acid), palmitoleic acid [(9Z)-hexadec-9-enoic acid], margaric acid (heptadecanoic acid), stearic acid (octadecanoic acid), oleic acid [(9Z)-octadec-9-enoic acid], elaidic acid [(9E)-octadec-9-enoic acid], linoleic acid [(9Z,12Z)-octadeca-9,12-dienoic acid], linolenic acid [(9Z,12Z,15Z)-octadeca-9,12,15-trienoic acid], eleostearic acid [(9Z,11E,13E)-octadeca-9,11,13-trienoic acid], ricinoleic acid ((R)-12-hydroxy-(Z)-octadec-9-enoic acid), isoricinoleic acid [(5)-9-hydroxy-(Z)-octadec-12-enoic acid], nonadecanoic acid, arachidic acid (eicosanoic acid), behenic acid (docosanoic acid) and erucic acid [(13Z)-docos-13-enoic acid].

Among these, the structural element R$^1$—COO— in formula (V) is preferably derived from decanoic acid (capric acid), dodecanoic acid (lauric acid), tetradecanoic acid (myristic acid), palmitic acid (hexadecanoic acid), palmitoleic acid [(9Z)-hexadec-9-enoic acid], stearic acid (octadecanoic acid), oleic acid [(9Z)-octadec-9-enoic acid] or arachidic acid (eicosanoic acid), particularly preferably from tetradecanoic acid (myristic acid), palmitic acid (hexadecanoic acid), palmitoleic acid [(9Z)-hexadec-9-enoic acid], stearic acid (octadecanoic acid), oleic acid [(9Z)-octadec-9-enoic acid], ricinoleic acid ((R)-12-hydroxy-(Z)-octadec-9-enoic acid), isoricinoleic acid [(5)-9-hydroxy-(Z)-octadec-12-enoic acid] or arachidic acid (eicosanoic acid), very particularly preferably from palmitic acid (hexadecanoic acid), palmitoleic acid [(9Z)-hexadec-9-enoic acid], stearic acid (octadecanoic acid), oleic acid [(9Z)-octadec-9-enoic acid] or arachidic acid (eicosanoic acid) and in particular from stearic acid (octadecanoic acid).

Particular mention may be made of the twenty-fold, forty-fold and sixty-fold ethoxylated alkoxylates thereof.

In a further preferred embodiment, it is possible to employ fatty acid mixtures which are obtainable industrially from the work-up of natural, vegetable or animal fats and oils, particularly preferably from linseed oil, coconut oil, palm kernel oil, palm oil, soy oil, peanut oil, cocoa butter, shea butter, cottonseed oil, maize oil, sunflower oil, rapeseed oil or castor oil, very particularly preferably from linseed oil, palm oil, soy oil, peanut oil, cocoa butter, shea butter, cottonseed oil, maize oil, sunflower oil, rapeseed oil or castor oil.

Mixtures of saturated and unsaturated fatty acids can also be employed.

The compounds (V) are, for example, obtainable by reaction of the respective acids or esters, preferably the C$_1$-C$_4$-alkyl esters or glycerides, having the structural element R$^1$—COO— in formula (V) with the respective alcohol HO—[—$X_i$—]$_n$—H in an esterification or transesterification under known conditions.

The respective acids R$^1$—COOH or salts thereof are preferably, however, reacted with alkylene oxides to the desired average statistical degree of alkoxylation, preferably under basic conditions. This is particularly preferred when the structural unit $X_i$ is derived from ethylene oxide or propylene oxide, preferably from ethylene oxide.

According to the invention, the compounds (V) reduce corrosion, in particular nonferrous metal corrosion, but can also perform other tasks in the coolant compositions of the invention, for example reducing foam formation (antifoams, defoamers). Among the compounds (V), preference is given to those which reduce both foam formation and corrosion, in particular nonferrous metal corrosion, with particular preference being given to those which do not significantly influence foam formation but reduce corrosion, in particular nonferrous metal corrosion.

In the compounds of the formula (VI), the structural element R$^2$—O— is preferably derived from fatty alcohols which are preferably obtainable by hydrogenation of fatty acids and esters, particularly preferably by hydrogenation of the abovementioned fatty acids. In a particular embodiment, the radical R$^2$ is thus a R$^1$—CH$_2$— radical. What has been said above with regard to the fatty acids also applies analogously to the fatty alcohols.

In a preferred embodiment, the fatty alcohols are octyl alcohol (capryl alcohol), nonyl alcohol (pelargonyl alcohol), decyl alcohol (capric alcohol), undecyl alcohol, dodecyl alcohol (lauryl alcohol), tridecyl alcohol, tetradecyl alcohol (myristyl alcohol), pentadecyl alcohol, hexadecyl alcohol (cetyl alcohol, palmityl alcohol), heptadecyl alcohol, octadecyl alcohol (stearyl alcohol), oleyl alcohol, elaidyl alcohol, linoleyl alcohol, linolenoyl alcohol, nonadecyl alcohol, eicosyl alcohol (arachyl alcohol) or mixtures thereof.

In a preferred embodiment, the compounds of the formula (VI) are alkoxylated castor oils, particularly preferably hydrogenated alkoxylated castor oils, very particularly preferably ethoxylated, propoxylated and/or butoxylated castor oils, in particular ethoxylated castor oils.

Further examples of alcohols having the structural element $R^2$—O— are n-octanol, 2-ethylhexanol, 2-propylheptanol, tridecanol isomer mixtures and heptadecanol isomer mixtures.

Particular mention may be made of the twenty-fold and forty-fold ethoxylated alkoxylates thereof.

A tridecanol isomer mixture as parent alcohol $R^2$—OH is a mixture of alcohols having 13 carbon atoms, particularly preferably a mixture obtainable by hydroformylation from a $C_{12}$-olefin mixture which is in turn obtainable by oligomerization of an olefin mixture comprising predominantly hydrocarbons having four carbon atoms.

On statistical average, this olefin mixture has from 11 to 13 carbon atoms, preferably from 11.1 to 12.9, particularly preferably from 11.2 to 12.8, very particularly preferably from 11.5 to 12.5 and in particular from 11.8 to 12.2.

In a very particularly preferred embodiment, this alcohol $R^1$—OH has an average degree of branching, measured as ISO index, of from 2.8 to 3.7.

In particular, this alcohol $R^2$—OH is obtained by a process as described in WO 00/02978 or WO 00/50543.

A heptadecanol isomer mixture as parent alcohol $R^2$—OH is a mixture of alcohols having 17 carbon atoms, particularly preferably a mixture which is obtainable by hydroformylation of a $C_{16}$-olefin mixture which in turn is obtainable by oligomerization of an olefin mixture which predominantly comprises hydrocarbons having four carbon atoms.

On statistical average, this olefin mixture has from 15 to 17 carbon atoms, preferably from 15.1 to 16.9, particularly preferably from 15.2 to 16.8, very particularly preferably from 15.5 to 16.5 and in particular from 15.8 to 16.2.

In a very particularly preferred embodiment, this alcohol $R^1$—OH has an average degree of branching, measured as ISO index, of from 2.8 to 3.7.

In particular, this alcohol $R^1$—OH is obtained by a process as described in WO 2009/124979 A1, there in particular page 5, line 4 to page 16, line 29, and also the examples of page 19, line 19 to page 21, line 25, which is hereby incorporated by reference into the present disclosure.

A $C_{17}$-alcohol mixture having particularly advantageous use properties can be prepared by this preferred process as product of the transition metal-catalyzed oligomerization of olefins having from 2 to 6 carbon atoms. Here, a $C_{16}$-olefin mixture is firstly isolated by distillation from the product of the olefin oligomerization and only subsequently is this $C_{16}$-olefin mixture subjected to hydroformylation. This makes it possible to provide a more highly branched $C_{17}$-alcohol mixture having particularly advantageous use properties.

The compounds (VI) are preferably obtainable by reacting the corresponding alcohols $R^2$—OH with alkylene oxides to the desired average statistical degree of alkoxylation, preferably under basic conditions. This is particularly preferred when the structural unit $X_i$ is derived from ethylene oxide or propylene oxide, preferably from ethylene oxide.

According to the invention, the compounds (VI) reduce corrosion, in particular nonferrous metal corrosion, but can also perform other tasks in the coolant compositions of the invention, for example reducing foam formation (antifoams, defoamers). Among the compounds (V), preference is given to those which reduce both foam formation and also corrosion, in particular nonferrous metal corrosion, with particular preference being given to those which do not significantly influence foam formation but reduce corrosion, in particular nonferrous metal corrosion.

In the compounds of the formula (VII), the structural element $R^3$—N< is preferably derived from fatty amines which are preferably obtainable by hydrogenation and amination of fatty acids and esters, particularly preferably by hydrogenation and amination of the abovementioned fatty acids or amination of the abovementioned fatty alcohols. What has been said with regard to the fatty alcohols also applies analogously to the fatty amines.

As radicals $R^3$, preference is given to alkyl radicals over alkenyl radicals.

In a preferred embodiment, the fatty amines are n-hexylamine, 2-methylpentylamine, n-heptylamine, 2-heptylamine, isoheptylamine, 1-methylhexylamine, n-octylamine, 2-ethylhexylamine, 2-aminooctane, 6-methyl-2-heptylamine, n-nonylamine, isononylamine, n-decylamine and 2-propylheptylamine or mixtures thereof.

Particular preference is given to n-hexylamine, n-octylamine, 2-ethylhexylamine and n-decylamine, with n-octylamine and 2-ethylhexylamine, in particular n-octylamine, being particularly preferred.

Particular mention may be made of two-fold, eight-fold, twenty-fold and forty-fold ethoxylated n-octylamine and also eight-fold, twenty-fold and forty-fold ethoxylated n-hexylamine.

In the alkoxylated amines of the general formula (VII), the degree of alkoxylation refers to the sum (p+q), i.e. to the average total number of alkoxylation units per molecule of amine.

The compounds (VII) are preferably obtainable by reacting the corresponding amines $R^3$—$NH_2$ with alkylene oxides to the desired average statistical degree of alkoxylation, preferably under basic conditions. This is particularly preferred when the structural unit $X_i$ is derived from ethylene oxide or propylene oxide, preferably from ethylene oxide.

The compounds of the formulae (V) to (VII), preferably the compounds of the formulae (V) and (VII), particularly preferably the compounds of the formula (VII), are particularly suitable for reducing nonferrous metal corrosion in the use of coolant compositions in fuel cells and are accordingly added to the coolant compositions in a method according to the invention.

Ready-to-use aqueous coolant compositions which have a conductivity of not more than 50 µS/cm, preferably up to 40 µS/cm, particularly preferably up to 30 and in particular up to 20 µS/cm, and consist essentially of (a) from 10 to 90% by weight of alkylene glycols or derivatives thereof,
(b) from 90 to 10% by weight of water,
(c) from 0.005 to 5% by weight, in particular from 0.0075 to 2.5% by weight, especially from 0.01 to 1% by weight, of the azole derivatives mentioned, and
(d) optionally at least one ortho-silicic ester and also
(e) from 0.05 to 5% by weight, in particular from 0.1 to 1% by weight, especially from 0.2 to 0.5% by weight, of at least one of the compounds (V), (VI) and/or (VII) can be produced from the antifreeze concentrates of the invention by dilution with ion-free water. The sum of all components here is 100% by weight.

The present invention therefore also provides ready-to-use aqueous coolant compositions for cooling systems in fuel cells and/or batteries, which consist essentially of
(a) from 10 to 90% by weight of alkylene glycols or derivatives thereof,
(b) from 90 to 10% by weight of water,
(c) from 0.005 to 5% by weight, in particular from 0.0075 to 2.5% by weight, especially from 0.01 to 1% by weight, of the azole derivatives mentioned, and
(d) optionally at least one ortho-silicic ester and also
(e) from 0.05 to 5% by weight, in particular from 0.1 to 1% by weight, especially from 0.2 to 0.5% by weight, of at least one of the compounds (V), (VI) and/or (VII) and are obtainable by dilution of the specified antifreeze concentrates with ion-free water. The sum of all components here is 100% by weight.

The ready-to-use aqueous coolant compositions of the invention have an initial electrical conductivity of not more than 50 µS/cm, in particular 25 µS/cm, preferably 10 µS/cm, especially 5 µS/cm. The conductivity is maintained at this low level over a long period of time during long-term operation of the fuel cell, in particular when a cooling system having an integrated ion exchanger is used in the fuel cell.

The pH of the ready-to-use aqueous coolant compositions of the invention decreases significantly more slowly over the period of operation than in the case of cooling liquids to which the azole derivatives mentioned have not been added. The pH is usually in the range from 4.5 to 7 in the case of fresh coolant compositions according to the invention and in long-term operation usually decreases to 3.5. The ion-free water used for dilution can be pure distilled or twice-distilled water or water which has been deionized, for example by ion exchange.

The preferred mixing ratio by weight of alkylene glycol or derivatives thereof to water in the ready-to-use aqueous coolant compositions is from 20:80 to 80:20, in particular from 25:75 to 75:25, preferably from 65:35 to 35:65, especially from 60:40 to 40:60. As alkylene glycol component or derivative thereof, it is possible to use, in particular, monoethylene glycol, diethylene glycol, triethylene glycol, tetraethylene glycol and mixtures thereof, but also monopropylene glycol, dipropylene glycol and mixtures thereof, polyglycols, glycol ethers, for example monoethylene glycol monomethyl ether, diethylene glycol monomethyl ether, triethylene glycol monomethyl ether, tetraethylene glycol monomethyl ether, monoethylene glycol monoethyl ether, diethylene glycol monoethyl ether, triethylene glycol monoethyl ether, tetraethylene glycol monoethyl ether, monoethylene glycol mono-n-butyl ether, diethylene glycol mono-n-butyl ether, triethylene glycol mono-n-butyl ether and tetraethylene glycol mono-n-butyl ether, or glycerol, in each case either alone or as mixtures thereof. Particular preference is given to monoethylene glycol alone or mixtures of monoethylene glycol as main component, i.e. having a content in the mixture of more than 50% by weight, in particular more than 80% by weight, especially more than 95% by weight, with other alkylene glycols or derivatives of alkylene glycols.

The antifreeze concentrates of the invention themselves, from which the above-described ready-to-use aqueous coolant compositions result, can be produced by dissolving the azole derivatives mentioned in alkylene glycols or derivatives thereof, which can be used in water-free form or with a small content of water (up to about 10% by weight, in particular up to 5% by weight).

The present invention also provides for the use of at least one of the compounds (V), (VI) and/or (VII) for producing antifreeze concentrates for cooling systems in fuel cells and/or batteries, in particular in motor vehicles, particularly preferably in passenger cars and commercial vehicles, based on alkylene glycols or derivatives thereof.

The present invention further provides for the use of these antifreeze concentrates for producing ready-to-use aqueous coolant compositions having a conductivity of not more than 50 µS/cm for cooling systems in fuel cells and/or batteries, in particular in motor vehicles, particularly preferably in passenger cars and commercial vehicles.

The coolant compositions of the invention can also be used in a fuel cell apparatus as described in DE-A 101 04 771 (6), in which the cooling medium is additionally electrochemically deionized in order to prevent corrosion.

EXAMPLES

The invention is illustrated in the following examples, but without it being restricted thereto.

The test solutions were tested in accordance with the test method ASTM D1384 with the modification that the aqueous dilution with ASTM water to 33% of volume, which is usual in accordance with ASTM D1384, is omitted. Instead, the test fluid (about 50% strength by volume solution with distilled water) was tested without further dilution since a battery coolant has to have a low electrical conductivity of about 20 µS/cm, but ASTM D1384 water has a high electrical conductivity (caused by the corrosion accelerators in the form of various cations and anions).

Compositions of the Test Fluids

| Starting materials | Fluid 1 | Fluid 2 | Fluid 3 | Fluid 4 | Fluid 5 | Fluid 6 |
|---|---|---|---|---|---|---|
| Monoethylene glycol | 50.0 | 50.0 | 50.0 | 50.0 | 50.0 | 50.0 |
| Water | 49.8 | 49.8 | 49.8 | 49.8 | 49.8 | 49.8 |
| Benzotriazole | 0.1 | 0.1 | 0.1 | 0.1 | 0.1 | 0.1 |
| Tetraethoxysilane | 0.1 | 0.1 | 0.1 | 0.1 | 0.1 | 0.1 |
| To this were added |  |  |  |  |  |  |
| Castor oil ethoxylate (hydrogenated) with 60 EO | 0.25 |  |  | 0.2 |  |  |
| Caprylamine ethoxylate with 2 EO | 0.03 | 0.03 | 0.047 | 0.042 | 0.038 | 0.037 |
| Castor oil ethoxylate with 40 EO |  | 0.2 |  |  | 0.2 |  |
| Castor oil ethoxylate with 20 EO |  | 0.05 |  |  |  | 0.2 |

The comparison of the base composition composed of monoethylene glycol, water, benzotriazole and tetraethoxysilane without further additives led to very severe corrosion on iron materials within a few hours, associated with an increase in the electrical conductivity to values of greater than 1000 µS/cm.

On the other hand, when the additives were present, the following physical data were obtained in accordance with ASTM D1384 (without aqueous dilution with ASTM water to 33% by volume):

|  | Fluid 1 | Fluid 2 | Fluid 3 | Fluid 4 | Fluid 5 | Fluid 6 |
|---|---|---|---|---|---|---|
| pH, before test | 7.5 | 7.48 | 7.00 | 7.00 | 7.00 | 7.00 |
| pH, after test | 6.9 | 6.8 | 7.44 | 7.32 | 7.11 | 7.04 |
| Alkali reserve of ml of HCl 0.1 mol/l before test | 0.49 | 0.18 | 0.39 | 0.36 | 0.38 | 0.35 |
| Alkali reserve of ml of HCl 0.1 mol/l after test | 0.1 | 0.08 | 0.26 | 0.27 | 0.10 | 0.20 |
| Conductivity in µS/cm before test | n.b. | 19.5 | 28.2 | 25.9 | 24.0 | 23.1 |
| Conductivity in µS/cm after test | 23.5 | 24.5 | 30.8 | 29.2 | 27.0 | 27.1 |

The following degrees of corrosion were determined in accordance with ASTM D1384 (specific change in mass with corrosion blank mg/cm$^2$)

|  | Fluid 1 | Fluid 2 | Fluid 3 | Fluid 4 | Fluid 5 | Fluid 6 |
|---|---|---|---|---|---|---|
| Copper F-CU | −0.04 | 0.06 | −0.03 | −0.03 | −0.10 | −0.10 |
| Soft solder L - PbSn30 BASF | −0.34 | −0.19 | −0.10 | −0.20 | −0.11 | −0.11 |
| Brass Ms - 63 | −0.13 | 0.06 | −0.10 | −0.09 | −0.17 | −0.17 |
| Steel H - II | −0.02 | 0.02 | 0.00 | 0.01 | −0.01 | −0.01 |
| Grey cast iron GG - 25 | −0.56 | 0.03 | −0.33 | 0.02 | 0.01 | 0.01 |
| Cast aluminum G - AlSi6Cu4 | 0.06 | 0.11 | −0.06 | 0.05 | 0.05 | 0.04 |

Compositions of Further Test Fluids

| Starting materials | Fluid 7 | Fluid 8 | Fluid 9 | Fluid 10 | Fluid 11 | Fluid 12 | Fluid 13 (Comparison) |
|---|---|---|---|---|---|---|---|
| Monoethylene glycol | 50.0 | 50.0 | 50.0 | 50.0 | 50.0 | 50.0 | 50.0 |
| Water | 49.8 | 49.8 | 49.8 | 49.8 | 49.8 | 49.8 | 49.8 |
| Benzotriazole | 0.1 | 0.1 | 0.1 | 0.1 | 0.1 | 0.1 | 0.1 |
| Tetraethoxysilane | 0.1 | 0.1 | 0.1 | 0.1 | 0.1 | 0.1 | 0.1 |
| To this were added |  |  |  |  |  |  |  |
| Compound 1* | 0.25 | — | — | 0.2 | — | — | — |
| Compound 2** | 0.03 | 0.03 | 0.04 | 0.042 | 0.038 | 0.037 | — |
| Compound 3*** | — | 0.2 | — | — | 0.2 | — | — |
| Compound 4**** | — | 0.05 | — | — | — | 0.2 | — |

*Compound 1: commercial, on statistical average 60-fold ethoxylated octadecanoic acid

**Compound 2: commercial, double ethoxylated n-octylamine

***Compound 3: commercial, on statistical average 40-fold ethoxylated octadecanoic acid

****Compound 4: commercial, on statistical average 20-fold ethoxylated $C_{18}$-carboxylic acid, mixture of saturated and unsaturated carboxylic acids When the additives were present, the following physical data were obtained in accordance with ASTM D1384 (without aqueous dilution with ASTM water to 33% by volume):

|  | Fluid 7 | Fluid 8 | Fluid 9 | Fluid 10 | Fluid 11 | Fluid 12 | Fluid 13 (Comparison) |
|---|---|---|---|---|---|---|---|
| pH, before test | 6.57 | 6.61 | 6.86 | 6.87 | 6.82 | 6.86 | 4.85 |
| pH, after test | 6.11 | 6.05 | 6.45 | 6.35 | 6.26 | 6.19 | 3.76 |
| Alkali reserve of ml of HCl 0.1 mol/l before test | 0.25 | 0.25 | 0.23 | 0.29 | 0.22 | 0.26 | 0 |
| Alkali reserve of ml of HCl 0.1 mol/l after test | 0 | 0.13 | 0.23 | 0.23 | 0.15 | 0.10 | 0 |
| Conductivity in µS/cm before test | 21.5 | 22.0 | 27.8 | 26.2 | 22.9 | 22.9 | 0.8 |
| Conductivity in µS/cm after test | 23.9 | 22.2 | 31.5 | 28.8 | 26.8 | 25.6 | 23.6 |

The following degrees of corrosion were determined in accordance with ASTM D1384 (specific change in mass without corrosion blank mg/cm$^2$)

|  | Fluid 7 | Fluid 8 | Fluid 9 | Fluid 10 | Fluid 11 | Fluid 12 | Fluid 13 (Comparison) |
|---|---|---|---|---|---|---|---|
| Copper F-CU | −0.05 | −0.05 | −0.05 | −0.07 | −0.06 | −0.07 | −0.06 |
| Soft solder L - PbSn30 BASF | −0.18 | −0.12 | −0.12 | −0.16 | −0.14 | −0.06 | −0.49 |
| Brass Ms - 63 | −0.06 | −0.09 | −0.06 | −0.10 | −0.09 | −0.09 | −0.15 |
| Steel H - II | +0.01 | ±0.00 | −0.01 | −0.01 | −0.02 | ±0.00 | −4.16 |
| Grey cast iron GG -25 | −0.04 | +0.03 | −0.08 | +0.02 | +0.04 | +0.05 | −6.18 |
| Cast aluminum G - AlSi6Cu4 | +0.09 | +0.06 | +0.04 | +0.11 | +0.12 | +0.05 | +0.20 |

Compositions of Further Test Fluids with Tolutriazole as Corrosion Inhibitor

| Starting materials | Fluid 14 | Fluid 15 | Fluid 16 | Fluid 17 | Fluid 18 | Fluid 19 | Fluid 20 (Comparison) |
|---|---|---|---|---|---|---|---|
| Monoethylene glycol | 50.0 | 50.0 | 50.0 | 50.0 | 50.0 | 50.0 | 50.0 |
| Water | 49.8 | 49.8 | 49.8 | 49.8 | 49.8 | 49.8 | 49.8 |
| Tolutriazole | 0.1 | 0.1 | 0.1 | 0.1 | 0.1 | 0.1 | 0.1 |
| Tetraethoxysilane | 0.1 | 0.1 | 0.1 | 0.1 | 0.1 | 0.1 | 0.1 |
| To this were added |  |  |  |  |  |  |  |
| Compound 1 | 0.25 | — | — | 0.2 | — | — | — |
| Compound 2 | 0.03 | 0.03 | 0.04 | 0.042 | 0.038 | 0.037 | — |
| Compound 3 | — | 0.2 | — | — | 0.2 | — | — |
| Compound 4 | — | 0.05 | — | — | — | 0.2 | — |

When the additives were present, the following physical data were obtained in accordance with ASTM D1384 (without aqueous dilution with ASTM water to 33% by volume):

|  | Fluid 14 | Fluid 15 | Fluid 16 | Fluid 17 | Fluid 18 | Fluid 19 | Fluid 20 (Comparison) |
|---|---|---|---|---|---|---|---|
| pH, before test | 6.93 | 6.99 | 7.18 | 7.19 | 7.08 | 7.07 | 4.45 |
| pH, after test | 6.04 | 6.62 | 6.97 | 6.73 | 6.76 | 6.65 | 3.76 |
| Alkali reserve of ml of HCl 0.1 mol/l before test | 0.24 | 0.23 | 0.27 | 0.26 | 0.20 | 0.25 | 0 |
| Alkali reserve of ml of HCl 0.1 mol/l after test | 0.05 | 0.09 | 0.21 | 0.15 | 0.09 | 0.08 | 0 |
| Conductivity in μS/cm before test | 17.8 | 19.0 | 23.5 | 23.0 | 20.8 | 20.2 | 0.8 |
| Conductivity in μS/cm after test | 23.2 | 20.7 | 28.5 | 30.9 | 22.9 | 23.9 | 21.1 |

The following degrees of corrosion were determined in accordance with ASTM D1384 (specific change in mass without corrosion blank mg/cm$^2$)

|  | Fluid 14 | Fluid 15 | Fluid 16 | Fluid 17 | Fluid 18 | Fluid 19 | Fluid 20 (Comparison) |
|---|---|---|---|---|---|---|---|
| Copper F-CU | −0.07 | −0.05 | −0.07 | −0.05 | −0.07 | −0.07 | −0.04 |
| Soft solder L - PbSn30 BASF | −0.29 | −0.06 | −0.09 | −0.28 | −0.11 | −0.05 | −0.22 |
| Brass Ms - 63 | −0.08 | −0.09 | −0.07 | −0.09 | −0.10 | −0.12 | −0.05 |
| Steel H - II | −0.03 | −0.01 | −0.02 | ±0.00 | ±0.00 | +0.02 | −4.02 |
| Grey cast iron GG-25 | −0.15 | +0.03 | −0.24 | −0.93 | +0.02 | +0.04 | −7.12 |
| Cast aluminum G - AlSi6Cu4 | +0.05 | +0.09 | +0.08 | +0.08 | +0.04 | +0.05 | +0.13 |

Further test fluids are listed in Tables 1 to 23.

TABLE 1

| Starting materials | Fluid 31 | Fluid 32 | Fluid 33 | Fluid 34 | Fluid 35 | Fluid 36 | Fluid 37 (Comparison) |
|---|---|---|---|---|---|---|---|
| 1,2-Propylene glycol | 50 | 50 | 50 | 50 | 50 | 50 | 50 |
| Water | to 100 | to 100 | to 100 | to 100 | to 100 | to 100 | to 100 |
| Benzotriazole | 0.1 | 0.1 | 0.1 | 0.1 | 0.1 | 0.1 | 0.1 |
| Tetraethoxysilane | 0.1 | 0.1 | 0.1 | 0.1 | 0.1 | 0.1 | 0.1 |
| To this were added |  |  |  |  |  |  |  |
| Compound 2 | 0.03 | 0.03 | 0.04 | 0.042 | 0.038 | 0.037 | — |
| Compound 4 | — | 0.05 | — | — | — | 0.2 | — |
| Compound 3 | — | 0.2 | — | — | 0.2 | — | — |
| Compound 1 | 0.25 | — | — | 0.2 | — | — | — |

TABLE 2

| Starting materials | Fluid 41 | Fluid 42 | Fluid 43 | Fluid 44 | Fluid 45 | Fluid 46 | Fluid 47 |
|---|---|---|---|---|---|---|---|
| 1,2-Propylene glycol | 50 | 50 | 50 | 50 | 50 | 50 | 50 |
| Water | to 100 | to 100 | to 100 | to 100 | to 100 | to 100 | to 100 |
| Benzotriazole | 0.1 | 0.1 | 0.1 | 0.1 | 0.1 | 0.1 | 0.1 |
| Triethoxymethylsilane | 0.1 | 0.1 | 0.1 | 0.1 | 0.1 | 0.1 | 0.1 |
| To this were added |  |  |  |  |  |  |  |
| 8-fold ethoxylated octylamine | 0.3 |  |  |  |  |  |  |
| 20-fold ethoxylated octylamine |  | 0.3 |  |  |  |  |  |
| 40-fold ethoxylated octylamine |  |  | 0.3 |  |  |  |  |
| 60-fold ethoxylated octylamine |  |  |  | 0.3 |  |  |  |
| 8-fold ethoxylated hexylamine |  |  |  |  | 0.3 |  |  |
| 20-fold ethoxylated hexylamine |  |  |  |  |  | 0.3 |  |
| 40-fold ethoxylated hexylamine |  |  |  |  |  |  | 0.3 |
| Compound 4 | 0.25 | 0.25 | 0.25 | 0.25 | 0.25 | 0.25 | 0.25 |

TABLE 3

| Starting materials | Fluid 51 | Fluid 52 | Fluid 53 | Fluid 54 | Fluid 55 | Fluid 56 | Fluid 57 |
|---|---|---|---|---|---|---|---|
| 1,2-Propylene glycol | 50 | 50 | 50 | 50 | 50 | 50 | 50 |
| Water | to 100 | to 100 | to 100 | to 100 | to 100 | to 100 | to 100 |
| Benzotriazole | 0.1 | 0.1 | 0.1 | 0.1 | 0.1 | 0.1 | 0.1 |
| Triethoxymethylsilane | 0.1 | 0.1 | 0.1 | 0.1 | 0.1 | 0.1 | 0.1 |
| To this were added |  |  |  |  |  |  |  |
| 8-fold ethoxylated octylamine | 0.3 |  |  |  |  |  |  |
| 20-fold ethoxylated octylamine |  | 0.3 |  |  |  |  |  |
| 40-fold ethoxylated octylamine |  |  | 0.3 |  |  |  |  |
| 60-fold ethoxylated octylamine |  |  |  | 0.3 |  |  |  |
| 8-fold ethoxylated hexylamine |  |  |  |  | 0.3 |  |  |
| 20-fold ethoxylated hexylamine |  |  |  |  |  | 0.3 |  |
| 40-fold ethoxylated hexylamine |  |  |  |  |  |  | 0.3 |
| Compound 3 | 0.25 | 0.25 | 0.25 | 0.25 | 0.25 | 0.25 | 0.25 |

TABLE 4

| Starting materials | Fluid 61 | Fluid 62 | Fluid 63 | Fluid 64 | Fluid 65 | Fluid 66 | Fluid 67 |
|---|---|---|---|---|---|---|---|
| 1,2-Propylene glycol | 50 | 50 | 50 | 50 | 50 | 50 | 50 |
| Water | to 100 | to 100 | to 100 | to 100 | to 100 | to 100 | to 100 |
| Benzotriazole | 0.1 | 0.1 | 0.1 | 0.1 | 0.1 | 0.1 | 0.1 |
| Triethoxymethylsilane | 0.1 | 0.1 | 0.1 | 0.1 | 0.1 | 0.1 | 0.1 |
| To this were added | | | | | | | |
| 8-fold ethoxylated octylamine | 0.3 | | | | | | |
| 20-fold ethoxylated octylamine | | 0.3 | | | | | |
| 40-fold ethoxylated octylamine | | | 0.3 | | | | |
| 60-fold ethoxylated octylamine | | | | 0.3 | | | |
| 8-fold ethoxylated hexylamine | | | | | 0.3 | | |
| 20-fold ethoxylated hexylamine | | | | | | 0.3 | |
| 40-fold ethoxylated hexylamine | | | | | | | 0.3 |
| Compound 1 | 0.25 | 0.25 | 0.25 | 0.25 | 0.25 | 0.25 | 0.25 |

TABLE 5

| Starting materials | Fluid 71 | Fluid 72 | Fluid 73 | Fluid 74 | Fluid 75 | Fluid 76 |
|---|---|---|---|---|---|---|
| 1,2-Propylene glycol | 50 | 50 | 50 | 50 | 50 | 50 |
| Water | to 100 | to 100 | to 100 | to 100 | to 100 | to 100 |
| Benzotriazole | 0.1 | 0.1 | 0.1 | 0.1 | 0.1 | 0.1 |
| Diethoxydimethylsilane | 0.1 | 0.1 | 0.1 | 0.1 | 0.1 | 0.1 |
| To this were added | | | | | | |
| Compound 2 | 0.03 | 0.03 | 0.04 | 0.042 | 0.038 | 0.037 |
| Compound 4 | — | 0.05 | — | — | — | 0.2 |
| Compound 3 | — | 0.2 | — | — | 0.2 | — |
| Compound 1 | 0.25 | — | — | 0.2 | — | — |

TABLE 6

| Starting materials | Fluid 81 | Fluid 82 | Fluid 83 | Fluid 84 | Fluid 85 | Fluid 86 |
|---|---|---|---|---|---|---|
| 1,2-Propylene glycol | 50 | 50 | 50 | 50 | 50 | 50 |
| Water | to 100 | to 100 | to 100 | to 100 | to 100 | to 100 |
| Benzotriazole | 0.1 | 0.1 | 0.1 | 0.1 | 0.1 | 0.1 |
| Ethoxytrimethylsilane | 0.1 | 0.1 | 0.1 | 0.1 | 0.1 | 0.1 |
| To this were added | | | | | | |
| Compound 2 | 0.03 | 0.03 | 0.04 | 0.042 | 0.038 | 0.037 |
| Compound 4 | — | 0.05 | — | — | — | 0.2 |
| Compound 3 | — | 0.2 | — | — | 0.2 | — |
| Compound 1 | 0.25 | — | — | 0.2 | — | — |

TABLE 7

| Starting materials | Fluid 91 | Fluid 92 | Fluid 93 | Fluid 94 | Fluid 95 | Fluid 96 |
|---|---|---|---|---|---|---|
| 1,2-Propylene glycol | 50 | 50 | 50 | 50 | 50 | 50 |
| Water | to 100 | to 100 | to 100 | to 100 | to 100 | to 100 |
| Benzotriazole | 0.1 | 0.1 | 0.1 | 0.1 | 0.1 | 0.1 |
| Tetramethoxysilane | 0.1 | 0.1 | 0.1 | 0.1 | 0.1 | 0.1 |

TABLE 7-continued

| Starting materials | Fluid 91 | Fluid 92 | Fluid 93 | Fluid 94 | Fluid 95 | Fluid 96 |
|---|---|---|---|---|---|---|
| To this were added | | | | | | |
| Compound 2 | 0.03 | 0.03 | 0.04 | 0.042 | 0.038 | 0.037 |
| Compound 4 | — | 0.05 | — | — | — | 0.2 |
| Compound 3 | — | 0.2 | — | — | 0.2 | — |
| Compound 1 | 0.25 | — | — | 0.2 | — | — |

TABLE 8

| Starting materials | Fluid 101 | Fluid 102 | Fluid 103 | Fluid 104 | Fluid 105 | Fluid 106 |
|---|---|---|---|---|---|---|
| 1,2-Propylene glycol | 50 | 50 | 50 | 50 | 50 | 50 |
| Water | to 100 | to 100 | to 100 | to 100 | to 100 | to 100 |
| Benzotriazole | 0.1 | 0.1 | 0.1 | 0.1 | 0.1 | 0.1 |
| Dimethoxydimethylsilane | 0.1 | 0.1 | 0.1 | 0.1 | 0.1 | 0.1 |
| To this were added | | | | | | |
| Compound 2 | 0.03 | 0.03 | 0.04 | 0.042 | 0.038 | 0.037 |
| Compound 4 | — | 0.05 | — | — | — | 0.2 |
| Compound 3 | — | 0.2 | — | — | 0.2 | — |
| Compound 1 | 0.25 | — | — | 0.2 | — | — |

TABLE 9

| Starting materials | Fluid 111 | Fluid 112 | Fluid 113 | Fluid 114 | Fluid 115 | Fluid 116 | Fluid 117 | Fluid 118 (Comparison) |
|---|---|---|---|---|---|---|---|---|
| Diethylene glycol | 50 | 50 | 50 | 50 | 50 | 50 | 50 | 50 |
| Water | to 100 | to 100 | to 100 | to 100 | to 100 | to 100 | to 100 | to 100 |
| Benzotriazole | 0.1 | 0.1 | 0.1 | 0.1 | 0.1 | 0.1 | 0.1 | 0.1 |
| Triethoxymethylsilane | 0.1 | 0.1 | 0.1 | 0.1 | 0.1 | 0.1 | 0.1 | 0.1 |
| To this were added | | | | | | | | |
| 8-fold ethoxylated octylamine | 0.3 | | | | | | | |
| 20-fold ethoxylated octylamine | | 0.3 | | | | | | |
| 40-fold ethoxylated octylamine | | | 0.3 | | | | | |
| 60-fold ethoxylated octylamine | | | | 0.3 | | | | |
| 8-fold ethoxylated hexylamine | | | | | 0.3 | | | |
| 20-fold ethoxylated hexylamine | | | | | | 0.3 | | |
| 40-fold ethoxylated hexylamine | | | | | | | 0.3 | |
| Compound 3 | 0.25 | 0.25 | 0.25 | 0.25 | 0.25 | 0.25 | 0.25 | |

TABLE 10

| Starting materials | Fluid 121 | Fluid 122 | Fluid 123 | Fluid 124 | Fluid 125 | Fluid 126 | Fluid 127 | Fluid 128 (Comparison) |
|---|---|---|---|---|---|---|---|---|
| Triethylene glycol | 50 | 50 | 50 | 50 | 50 | 50 | 50 | 50 |
| Water | to 100 | to 100 | to 100 | to 100 | to 100 | to 100 | to 100 | to 100 |
| Benzotriazole | 0.1 | 0.1 | 0.1 | 0.1 | 0.1 | 0.1 | 0.1 | 0.1 |
| Triethoxymethylsilane | 0.1 | 0.1 | 0.1 | 0.1 | 0.1 | 0.1 | 0.1 | 0.1 |
| To this were added | | | | | | | | |
| 8-fold ethoxylated octylamine | 0.3 | | | | | | | |
| 20-fold ethoxylated octylamine | | 0.3 | | | | | | |

TABLE 10-continued

| Starting materials | Fluid 121 | Fluid 122 | Fluid 123 | Fluid 124 | Fluid 125 | Fluid 126 | Fluid 127 | Fluid 128 (Comparison) |
|---|---|---|---|---|---|---|---|---|
| 40-fold ethoxylated octylamine | | | 0.3 | | | | | |
| 60-fold ethoxylated octylamine | | | | 0.3 | | | | |
| 8-fold ethoxylated hexylamine | | | | | 0.3 | | | |
| 20-fold ethoxylated hexylamine | | | | | | 0.3 | | |
| 40-fold ethoxylated hexylamine | | | | | | | 0.3 | |
| Compound 3 | 0.25 | 0.25 | 0.25 | 0.25 | 0.25 | 0.25 | 0.25 | 15 |

TABLE 11

| Starting materials | Fluid 131 | Fluid 132 | Fluid 133 | Fluid 134 | Fluid 135 | Fluid 136 |
|---|---|---|---|---|---|---|
| 1,2-Propylene glycol | 50 | 50 | 50 | 50 | 50 | 50 |
| Water | to 100 | to 100 | to 100 | to 100 | to 100 | to 100 |
| Tolutriazole | 0.1 | 0.1 | 0.1 | 0.1 | 0.1 | 0.1 |
| Tetraethoxysilane | 0.1 | 0.1 | 0.1 | 0.1 | 0.1 | 0.1 |
| To this were added | | | | | | |
| Compound 2 | 0.03 | 0.03 | 0.04 | 0.042 | 0.038 | 0.037 |
| Compound 4 | — | 0.05 | — | — | — | 0.2 |
| Compound 3 | — | 0.2 | — | — | 0.2 | — |
| Compound 1 | 0.25 | — | — | 0.2 | — | — |

TABLE 12

| Starting materials | Fluid 141 | Fluid 142 | Fluid 143 | Fluid 144 | Fluid 145 | Fluid 146 | Fluid 147 |
|---|---|---|---|---|---|---|---|
| 1,2-Propylene glycol | 50 | 50 | 50 | 50 | 50 | 50 | 50 |
| Water | to 100 | to 100 | to 100 | to 100 | to 100 | to 100 | to 100 |
| Tolutriazole | 0.1 | 0.1 | 0.1 | 0.1 | 0.1 | 0.1 | 0.1 |
| Triethoxymethylsilane | 0.1 | 0.1 | 0.1 | 0.1 | 0.1 | 0.1 | 0.1 |
| To this were added | | | | | | | |
| 8-fold ethoxylated octylamine | 0.3 | | | | | | |
| 20-fold ethoxylated octylamine | | 0.3 | | | | | |
| 40-fold ethoxylated octylamine | | | 0.3 | | | | |
| 60-fold ethoxylated octylamine | | | | 0.3 | | | |
| 8-fold ethoxylated hexylamine | | | | | 0.3 | | |
| 20-fold ethoxylated hexylamine | | | | | | 0.3 | |
| 40-fold ethoxylated hexylamine | | | | | | | 0.3 |
| Compound 3 | 0.25 | 0.25 | 0.25 | 0.25 | 0.25 | 0.25 | 0.25 |

TABLE 13

| Starting materials | Fluid 151 | Fluid 152 | Fluid 153 | Fluid 154 | Fluid 155 | Fluid 156 | Fluid 157 (Comparison) |
|---|---|---|---|---|---|---|---|
| Monoethylene glycol | 50 | 50 | 50 | 50 | 50 | 50 | 50 |
| Water | to 100 | to 100 | to 100 | to 100 | to 100 | to 100 | to 100 |
| Benzotriazole | 0.1 | 0.1 | 0.1 | 0.1 | 0.1 | 0.1 | 0.1 |
| Tetraethoxysilane | 0.1 | 0.1 | 0.1 | 0.1 | 0.1 | 0.1 | 0.1 |

TABLE 13-continued

| Starting materials | Fluid 151 | Fluid 152 | Fluid 153 | Fluid 154 | Fluid 155 | Fluid 156 | Fluid 157 (Comparison) |
|---|---|---|---|---|---|---|---|
| To this were added | | | | | | | |
| 8-fold ethoxylated octylamine | 0.03 | 0.03 | 0.04 | 0.042 | 0.038 | 0.037 | — |
| Compound 4 | — | 0.05 | — | — | — | 0.2 | — |
| Compound 3 | — | 0.2 | — | — | 0.2 | — | — |
| Compound 1 | 0.25 | — | — | 0.2 | — | — | — |

TABLE 14

| Starting materials | Fluid 161 | Fluid 162 | Fluid 163 | Fluid 164 | Fluid 165 | Fluid 166 | Fluid 167 (Comparison) |
|---|---|---|---|---|---|---|---|
| Monoethylene glycol | 50 | 50 | 50 | 50 | 50 | 50 | 50 |
| Water | to 100 | to 100 | to 100 | to 100 | to 100 | to 100 | to 100 |
| Benzotriazole | 0.1 | 0.1 | 0.1 | 0.1 | 0.1 | 0.1 | 0.1 |
| Tetraethoxysilane | 0.1 | 0.1 | 0.1 | 0.1 | 0.1 | 0.1 | 0.1 |
| To this were added | | | | | | | |
| 20-fold ethoxylated octylamine | 0.03 | 0.03 | 0.04 | 0.042 | 0.038 | 0.037 | — |
| Compound 4 | — | 0.05 | — | — | — | 0.2 | — |
| Compound 3 | — | 0.2 | — | — | 0.2 | — | — |
| Compound 1 | 0.25 | — | — | 0.2 | — | — | — |

TABLE 15

| Starting materials | Fluid 171 | Fluid 172 | Fluid 173 | Fluid 174 | Fluid 175 | Fluid 176 | Fluid 177 (Comparison) |
|---|---|---|---|---|---|---|---|
| Monoethylene glycol | 50 | 50 | 50 | 50 | 50 | 50 | 50 |
| Water | to 100 | to 100 | to 100 | to 100 | to 100 | to 100 | to 100 |
| Benzotriazole | 0.1 | 0.1 | 0.1 | 0.1 | 0.1 | 0.1 | 0.1 |
| Tetraethoxysilane | 0.1 | 0.1 | 0.1 | 0.1 | 0.1 | 0.1 | 0.1 |
| To this were added | | | | | | | |
| 40-fold ethoxylated octylamine | 0.03 | 0.03 | 0.04 | 0.042 | 0.038 | 0.037 | — |
| Compound 4 | — | 0.05 | — | — | — | 0.2 | — |
| Compound 3 | — | 0.2 | — | — | 0.2 | — | — |
| Compound 1 | 0.25 | — | — | 0.2 | — | — | — |

TABLE 16

| Starting materials | Fluid 181 | Fluid 182 | Fluid 183 | Fluid 184 | Fluid 185 | Fluid 186 | Fluid 187 (Comparison) |
|---|---|---|---|---|---|---|---|
| Monoethylene glycol | 50 | 50 | 50 | 50 | 50 | 50 | 50 |
| Water | to 100 | to 100 | to 100 | to 100 | to 100 | to 100 | to 100 |
| Benzotriazole | 0.1 | 0.1 | 0.1 | 0.1 | 0.1 | 0.1 | 0.1 |
| Tetraethoxysilane | 0.1 | 0.1 | 0.1 | 0.1 | 0.1 | 0.1 | 0.1 |
| To this were added | | | | | | | |
| 60-fold ethoxylated octylamine | 0.03 | 0.03 | 0.04 | 0.042 | 0.038 | 0.037 | — |
| Compound 4 | — | 0.05 | — | — | — | 0.2 | — |
| Compound 3 | — | 0.2 | — | — | 0.2 | — | — |
| Compound 1 | 0.25 | — | — | 0.2 | — | — | — |

TABLE 17

| Starting materials | Fluid 191 | Fluid 192 | Fluid 193 | Fluid 194 | Fluid 195 | Fluid 196 | Fluid 197 (Comparison) |
|---|---|---|---|---|---|---|---|
| Monoethylene glycol | 50 | 50 | 50 | 50 | 50 | 50 | 50 |
| Water | to 100 | to 100 | to 100 | to 100 | to 100 | to 100 | to 100 |
| Benzotriazole | 0.1 | 0.1 | 0.1 | 0.1 | 0.1 | 0.1 | 0.1 |
| Tetraethoxysilane | 0.1 | 0.1 | 0.1 | 0.1 | 0.1 | 0.1 | 0.1 |
| To this were added | | | | | | | |
| 8-fold ethoxylated hexylamine | 0.03 | 0.03 | 0.04 | 0.042 | 0.038 | 0.037 | — |
| Compound 4 | — | 0.05 | — | — | — | 0.2 | — |
| Compound 3 | — | 0.2 | — | — | 0.2 | — | — |
| Compound 1 | 0.25 | — | — | 0.2 | — | — | — |
| | | | | 15 | | | |

TABLE 18

| Starting materials | Fluid 201 | Fluid 202 | Fluid 203 | Fluid 204 | Fluid 205 | Fluid 206 | Fluid 207 (Comparison) |
|---|---|---|---|---|---|---|---|
| Monoethylene glycol | 50 | 50 | 50 | 50 | 50 | 50 | 50 |
| Water | to 100 | to 100 | to 100 | to 100 | to 100 | to 100 | to 100 |
| Benzotriazole | 0.1 | 0.1 | 0.1 | 0.1 | 0.1 | 0.1 | 0.1 |
| Tetraethoxysilane | 0.1 | 0.1 | 0.1 | 0.1 | 0.1 | 0.1 | 0.1 |
| To this were added | | | | | | | |
| 20-fold ethoxylated hexylamine | 0.03 | 0.03 | 0.04 | 0.042 | 0.038 | 0.037 | — |
| Compound 4 | — | 0.05 | — | — | — | 0.2 | — |
| Compound 3 | — | 0.2 | — | — | 0.2 | — | — |
| Compound 1 | 0.25 | — | — | 0.2 | — | — | — |

TABLE 19

| Starting materials | Fluid 211 | Fluid 212 | Fluid 213 | Fluid 214 | Fluid 215 | Fluid 216 | Fluid 217 (Comparison) |
|---|---|---|---|---|---|---|---|
| Monoethylene glycol | 50 | 50 | 50 | 50 | 50 | 50 | 50 |
| Water | to 100 | to 100 | to 100 | to 100 | to 100 | to 100 | to 100 |
| Benzotriazole | 0.1 | 0.1 | 0.1 | 0.1 | 0.1 | 0.1 | 0.1 |
| Tetraethoxysilane | 0.1 | 0.1 | 0.1 | 0.1 | 0.1 | 0.1 | 0.1 |
| To this were added | | | | | | | |
| 40-fold ethoxylated hexylamine | 0.03 | 0.03 | 0.04 | 0.042 | 0.038 | 0.037 | — |
| Compound 4 | — | 0.05 | — | — | — | 0.2 | — |
| Compound 3 | — | 0.2 | — | — | 0.2 | — | — |
| Compound 1 | 0.25 | — | — | 0.2 | — | — | — |

TABLE 20

| Starting materials | Fluid 221 | Fluid 222 | Fluid 223 | Fluid 224 | Fluid 225 | Fluid 226 | Fluid 227 (Comparison) |
|---|---|---|---|---|---|---|---|
| Monoethylene glycol | 50 | 50 | 50 | 50 | 50 | 50 | 50 |
| Water | to 100 | to 100 | to 100 | to 100 | to 100 | to 100 | to 100 |
| Benzotriazole | 0.1 | 0.1 | 0.1 | 0.1 | 0.1 | 0.1 | 0.1 |
| Tetraethoxysilane | 0.1 | 0.1 | 0.1 | 0.1 | 0.1 | 0.1 | 0.1 |
| To this were added | | | | | | | |
| 60-fold ethoxylated hexylamine | 0.03 | 0.03 | 0.04 | 0.042 | 0.038 | 0.037 | — |
| Compound 4 | — | 0.05 | — | — | — | 0.2 | — |
| Compound 3 | — | 0.2 | — | — | 0.2 | — | — |
| Compound 1 | 0.25 | — | — | 0.2 | — | — | — |

TABLE 21

| Starting materials | Fluid 231 | Fluid 232 | Fluid 233 | Fluid 234 | Fluid 235 | Fluid 236 | Fluid 237 (Comparison) |
|---|---|---|---|---|---|---|---|
| Monoethylene glycol | 50 | 50 | 50 | 50 | 50 | 50 | 50 |
| Water | to 100 | to 100 | to 100 | to 100 | to 100 | to 100 | to 100 |
| Benzotriazole | 0.1 | 0.1 | 0.1 | 0.1 | 0.1 | 0.1 | 0.1 |
| Tetraethoxysilane | 0.1 | 0.1 | 0.1 | 0.1 | 0.1 | 0.1 | 0.1 |
| To this were added | | | | | | | |
| 20-fold ethoxylated n-octanol | 0.03 | 0.03 | 0.04 | 0.042 | 0.038 | 0.037 | — |
| Compound 4 | — | 0.05 | — | — | — | 0.2 | — |
| Compound 3 | — | 0.2 | — | — | 0.2 | — | — |
| Compound 1 | 0.25 | — | — | 0.2 | — | — | — |

TABLE 22

| Starting materials | Fluid 241 | Fluid 242 | Fluid 243 | Fluid 244 | Fluid 245 | Fluid 246 | Fluid 247 (Comparison) |
|---|---|---|---|---|---|---|---|
| Monoethylene glycol | 50 | 50 | 50 | 50 | 50 | 50 | 50 |
| Water | to 100 | to 100 | to 100 | to 100 | to 100 | to 100 | to 100 |
| Benzotriazole | 0.1 | 0.1 | 0.1 | 0.1 | 0.1 | 0.1 | 0.1 |
| Tetraethoxysilane | 0.1 | 0.1 | 0.1 | 0.1 | 0.1 | 0.1 | 0.1 |
| To this were added | | | | | | | |
| 40-fold ethoxylated n-octanol | 0.03 | 0.03 | 0.04 | 0.042 | 0.038 | 0.037 | — |
| Compound 4 | — | 0.05 | — | — | — | 0.2 | — |
| Compound 3 | — | 0.2 | — | — | 0.2 | — | — |
| Compound 1 | 0.25 | — | — | 0.2 | — | — | — |

TABLE 23

| Starting materials | Fluid 251 | Fluid 252 | Fluid 253 | Fluid 254 | Fluid 255 | Fluid 256 | Fluid 257 |
|---|---|---|---|---|---|---|---|
| Glycerol | 50 | 50 | 50 | 50 | 50 | 50 | 50 |
| Water | to 100 | to 100 | to 100 | to 100 | to 100 | to 100 | to 100 |
| Benzotriazole | 0.1 | 0.1 | 0.1 | 0.1 | 0.1 | 0.1 | 0.1 |
| Triethoxymethylsilane | 0.1 | 0.1 | 0.1 | 0.1 | 0.1 | 0.1 | 0.1 |
| To this were added | | | | | | | |
| 8-fold ethoxylated octylamine | 0.3 | | | | | | |
| 20-fold ethoxylated octylamine | | 0.3 | | | | | |
| 40-fold ethoxylated octylamine | | | 0.3 | | | | |
| 60-fold ethoxylated octylamine | | | | 0.3 | | | |
| 8-fold ethoxylated hexylamine | | | | | 0.3 | | |
| 20-fold ethoxylated hexylamine | | | | | | 0.3 | |
| 40-fold ethoxylated hexylamine | | | | | | | 0.3 |
| Compound 4 | 0.25 | 0.25 | 0.25 | 0.25 | 0.25 | 0.25 | 0.25 |

The invention claimed is:

1. A coolant composition having a conductivity of not more than 50 μS/cm, the composition comprising:
    at least one alkylene glycol or derivative thereof;
    one or more five-membered heterocyclic compounds, which are azole derivatives, and which have 2 or 3 heteroatoms selected from the group consisting of nitrogen and sulfur and comprise no or at most one sulfur atom and can bear an aromatic or saturated six-membered fused-on ring;
    ion free water; and
    at least one of the following compounds of formulae (VI) and/or (VII):

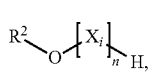

formula (VI)

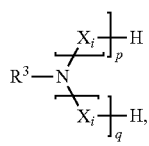

formula (VII)

wherein
$R^2$ is an organic radical having from 8 to 22 carbon atoms,
$R^3$ is an organic radical having from 6 to 10 carbon atoms,
n is a positive integer from 10 to 60,
p and q are each, independently of one another, a positive integer from 1 to 40,
and
each $X_i$ for i=1 to n, 1 to p and 1 to q is selected independently from the group consisting of —$CH_2$—$CH_2$—O—, —$CH_2$—$CH(CH_3)$—O—, —$CH(CH_3)$—$CH_2$—O—, —$CH_2$—$C(CH_3)_2$—O—, —$C(CH_3)_2$—$CH_2$—O—, —$CH_2$—$CH(C_2H_5)$—O—, —$CH(C_2H_5)$—$CH_2$—O—, —$CH(CH_3)$—$CH(CH_3)$—O—, —$CH_2$—$CH_2$—$CH_2$—O— and —$CH_2$—$CH_2$—$CH_2$—$CH_2$O—.

2. The coolant composition according to claim 1, comprising at least one compound of formula (VI), wherein the structural element $R^2$—O— in formula (VI) is derived from alcohols selected from the group consisting of octyl alcohol (capryl alcohol), nonyl alcohol (pelargonyl alcohol), decyl alcohol (capric alcohol), undecyl alcohol, dodecyl alcohol (lauryl alcohol), tridecyl alcohol, tetradecyl alcohol (myristyl alcohol), pentadecyl alcohol, hexadecyl alcohol (cetyl alcohol, palmityl alcohol), heptadecyl alcohol, octadecyl alcohol (stearyl alcohol), oleyl alcohol, elaidyl alcohol, linoleyl alcohol, linolenoyl alcohol, nonadecyl alcohol, eicosyl alcohol (arachyl alcohol) and mixtures thereof.

3. The coolant composition according to claim 1, comprising at least one compound of formula (VI), wherein the structural element $R^2$—O— in formula (VI) is derived from alcohols selected from the group consisting of 2-ethylhexanol, 2-propylheptanol, tridecanol isomer mixtures and heptadecanol isomer mixtures.

4. The coolant composition according to claim 1, comprising at least one compound of formula (VI), wherein the structural element $R^2$—O— in formula (VI) is derived alkoxylated caster oils.

5. The coolant composition according to claim 1, comprising at least one compound of formula (VII), wherein the structural element $R^3$—N< in formula (VII) is derived from amines selected from the group consisting of n-hexylamine, 2-methylpentylamine, n-heptylamine, 2-heptylamine, isoheptylamine, 1-methylhexylamine, n-octylamine, 2-ethylhexylamine, 2-aminooctane, 6-methyl-2-heptylamine, n-nonylamine, isononylamine, n-decylamine and 2-propylheptylamine and mixtures thereof.

6. The coolant composition according claim 1, wherein $X_i$ is —$CH_2$—$CH_2$—O—.

7. The coolant composition according to claim 1,
wherein the coolant composition comprises at least one compound of formula (VI) and n in formula (VI) is from 18 to 60,
and/or
wherein the coolant composition comprises at least one compound of formula (VII) and p and q in formula (VII) are each 1.

8. The coolant composition according to claim 1, comprising benzimidazole, benzotriazole, tolutriazole and/or hydrogenated tolutriazole as the azole derivatives.

9. The coolant composition according to claim 1, further comprising at least one ortho-silicic ester in such an amount that the silicon content in the coolant composition is from 2 to 2000 ppm by weight in a ready-to-use state.

10. The coolant composition according to claim 1, wherein the coolant composition consists essentially of:
(a) from 10 to 90% by weight of the at least one alkylene glycol or derivative thereof;
(b) from 90 to 10% by weight of the ion free water;
(c) from 0.005 to 5% by weight, of the one or more azole derivatives;
(d) optionally at least one ortho-silicic ester; and
(e) from 0.05 to 5% by weight of the at least one of the compounds of formulae (VI) and/or (VII); and
wherein the sum of all components (a) to (e) is 100% by weight.

11. The coolant composition according to claim 1, having a conductivity of not more than 30 µS/cm.

12. The coolant composition according to claim 1, further comprising a compound of formula (V):

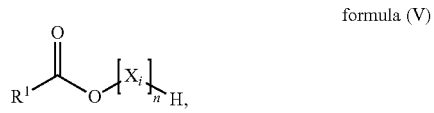

formula (V)

wherein
$R^1$ is an organic radical having from 7 to 21 carbon atoms,
n' is a positive integer from 10 to 60,
and
each $X_i$ for i=1 to n' is selected independently from the group consisting of —$CH_2$—$CH_2$—O—, —$CH_2$—$CH(CH_3)$—O—, —$CH(CH_3)$—$CH_2$—O—, —$CH_2$—$C(CH_3)_2$—O—, —$C(CH_3)_2$—$CH_2$—O—, —$CH_2$—$CH(C_2H_5)$—O—, —$CH(C_2H_5)$—$CH_2$—O—, —$CH(CH_3)$—$CH(CH_3)$—O—, —$CH_2$—$CH_2$—$CH_2$—O— and —$CH_2$—$CH_2$—$CH_2$—$CH_2$—O—.

13. The coolant composition according to claim 12, wherein the structural element $R^1$—COO— in the formula (V) is derived from acids selected from the group consisting of 2-ethylhexanoic acid, octanoic acid (caprylic acid), pelargonic acid (nonanoic acid), 2-propylheptanoic acid, decanoic acid (capric acid), undecanoic acid, dodecanoic acid (lauric acid), tridecanoic acid, tetradecanoic acid (myristic acid), pentadecanoic acid, palmitic acid (hexadecanoic acid), palmitoleic acid [(9Z)-hexadec-9-enoic acid], margaric acid (heptadecanoic acid), stearic acid (octadecanoic acid), oleic acid [(9Z)-octadec-9-enoic acid], elaidic acid [(9E)-octadec-9-enoic acid], linoleic acid [(9Z,12Z)-octadeca-9,12-dienoic acid], linolenic acid [(9Z,12Z,15Z)-octadeca-9,12,15-trienoic acid], eleostearic acid [(9Z,11E,13E)-octadeca-9,11,13-trienoic acid], ricinoleic acid ((R)-12-hydroxy-(Z)-octadec-9-enoic acid), isoricinoleic acid [(S)-9-hydroxy-(Z)-octadec-12-enoic acid], nonadecanoic acid, arachidic acid (eicosanoic acid), behenic acid (docosanoic acid) and erucic acid [(13Z)-docos-13-enoic acid].

14. The coolant composition according to claim 13, wherein the structural element $R^1$—COO— in the formula (V) originates from fatty acid mixtures originating from the work-up of linseed oil, coconut oil, palm kernel oil, palm oil, soy oil, peanut oil, cocoa butter, shea butter, cottonseed oil, maize oil, sunflower oil, rapeseed oil or castor oil.

15. The coolant composition according to claim 12, wherein the coolant composition consists essentially of:
(a) from 10 to 90% by weight of the at least one alkylene glycol or derivative thereof;
(b) from 90 to 10% by weight of the ion free water;
(c) from 0.005 to 5% by weight of the one or more azole derivatives;
(d) optionally at least one ortho-silicic ester; and
(e) from 0.05 to 5% by weight of a combined amount of the compound of formula (V) and the at least one compound of formulae (VI) and/or (VII); and
wherein the sum of all components (a) to (e) is 100% by weight.

16. The coolant composition according to claim 1, comprising at least one compound of formula (VII).

17. The coolant composition according to claim 1, comprising at least one compound of formula (VII), wherein $R^3$ is an alkyl or alkenyl radical having from 6 to 10 carbon atoms.

18. The coolant composition according to claim 1, comprising at least one compound of formula (VII), wherein $R^3$ is an alkyl radical having from 7 to 9 carbon atoms.

19. The coolant composition according to claim 1, wherein $X_i$ is —CH$_2$—CH$_2$—O— and p and q are independently of one another a positive integer from 1 to 30.

20. The coolant composition according to claim 1, comprising at least one compound of formula (VII), wherein the compound of formula (VII) is selected from the group consisting of two-fold ethoxylated n-octylamine, eight-fold ethoxylated n-octylamine, twenty-fold ethoxylated n-octylamine, forty-fold ethoxylated n-octylamine, eight-fold ethoxylated n-hexylamine, twenty-fold ethoxylated n-hexylamine, and forty-fold ethoxylated n-hexylamine.

21. The coolant composition according to claim 1, comprising at least one compound of formula (VII), wherein the compound of formula (VII) is selected from the group consisting of two-fold ethoxylated n-octylamine, eight-fold ethoxylated n-octylamine, twenty-fold ethoxylated n-octylamine, and forty-fold ethoxylated n-octylamine.

22. The coolant composition according to claim 1, comprising at least one compound of formula (VII), wherein the compound of formula (VII) is two-fold ethoxylated n-octylamine.

23. A method for producing a coolant composition having a conductivity of not more than 50 μS/cm, the method comprising:
admixing at least one antifreeze concentrate with water, wherein the antifreeze concentrate comprises:
at least one alkylene glycol or derivative thereof,
one or more five-membered heterocyclic compounds, which are azole derivatives which have 2 or 3 heteroatoms from the group consisting of nitrogen and sulfur and comprise no or at most one sulfur atom and can bear an aromatic or saturated six-membered fused-on ring, and
at least one of the following compounds of formulae (VI) and/or (VII):

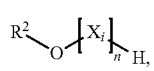
formula (VI)

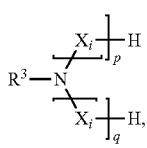
formula (VII)

wherein
$R^2$ is an organic radical having from 8 to 22 carbon atoms,
$R^3$ is an organic radical having from 6 to 10 carbon atoms,
n is a positive integer from 10 to 60,
p and q are each, independently of one another, a positive integer from 1 to 40,
and
each $X_i$ for i=1 to n, 1 to p and 1 to q is selected independently from the group consisting of —CH$_2$—CH$_2$—O—, —CH$_2$—CH(CH$_3$)—O—, —CH(CH$_3$)—CH$_2$—O—, —CH$_2$—C(CHs)$_2$—O—, —C(CH$_3$)$_2$—CH$_2$—O—, —CH$_2$—CH(C$_2$H$_5$)—O—, —CH(C$_2$H$_5$)—CH$_2$—O—, —CH(CH$_3$)—CH(CH$_3$)—O—, —CH$_2$—CH$_2$—CH$_2$—O— and —CH$_2$—CH$_2$—CH$_2$—CH$_2$O—.

24. The method according to claim 23, wherein the antifreeze concentrate comprises at least one compound of formula (VII).

25. The method according to claim 23, wherein the antifreeze concentrate comprises at least one compound of formula (VII), and wherein $R^3$ is an alkyl or alkenyl radical having from 6 to 10 carbon atoms.

26. The method according to claim 23, wherein the antifreeze concentrate comprises at least one compound of formula (VII), and wherein $R^3$ is an alkyl radical having from 7 to 9 carbon atoms.

27. The method according to claim 23, wherein $X_i$ is —CH$_2$—CH$_2$—O— and p and q are independently of one another a positive integer from 1 to 30.

28. The method according to claim 23, wherein the antifreeze concentrate comprises at least one compound of formula (VII), and wherein the compound of formula (VII) is selected from the group consisting of two-fold ethoxylated n-octylamine, eight-fold ethoxylated n-octylamine, twenty-fold ethoxylated n-octylamine, forty-fold ethoxylated n-octylammne, eight-fold ethoxylated n-hexylamine, twenty-fold ethoxylated n-hexylamine, and forty-fold ethoxylated n-hexylamine.

29. The method according to claim 23, wherein the antifreeze concentrate comprises at least one compound of formula (VII), and wherein the compound of formula (VII) is selected from the group consisting of two-fold ethoxylated n-octylamine, eight-fold ethoxylated n-octylamine, twenty-fold ethoxylated n-octylamine, and forty-fold ethoxylated n-octylamine.

30. The method according to claim 23, wherein the antifreeze concentrate comprises at least one compound of formula (VII), and wherein the compound of formula (VII) is two-fold ethoxylated n-octylamine.

31. A method, comprising reducing nonferrous metal corrosion using a coolant composition having a conductivity of not more than 50 μS/cm in a fuel cell and/or battery, the coolant composition comprising at least one antifreeze concentrate comprising:
at least one alkylene glycol or derivative thereof,
one or more five-membered heterocyclic compounds, which are azole derivatives which have 2 or 3 heteroatoms from the group consisting of nitrogen and sulfur and comprise no or at most one sulfur atom and can bear an aromatic or saturated six-membered fused-on ring,
ion free water, and
at least one of the following compounds of formulae (VI) and/or (VII):

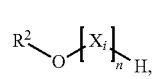

formula (VI)

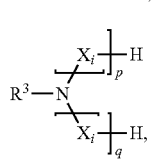

formula (VII)

wherein
$R^2$ is an organic radical having from 8 to 22 carbon atoms,
$R^3$ is an organic radical having from 6 to 10 carbon atoms,
n is a positive integer from 10 to 60,
p and q are each, independently of one another, a positive integer from 1 to 40,
and
each $X_i$ for i=1 to n, 1 to p and 1 to q is selected independently from the group consisting of —$CH_2$—$CH_2$—O—, —$CH_2$—$CH(CH_3)$—O—, —$CH(CH_3)$—$CH_2$—O—, —$CH_2$—$C(CH_3)_2$—O—, —$C(CH_3)_2$—$CH_2$—O—, —$CH_2$—$CH(C_2H_5)$—O—, —$CH(C_2H_5)$—$CH_2$—O—, —$CH(CH_3)$—$CH(CH_3)$—O—, —$CH_2$—$CH_2$—$CH_2$—O— and —$CH_2$—$CH_2$—$CH_2$—$CH_2O$—.

* * * * *